United States Patent
Burgdorf et al.

[11] Patent Number: 5,449,225
[45] Date of Patent: Sep. 12, 1995

[54] MASTER CYLINDER WITH TWO INTERNAL VALVES

[75] Inventors: Jochen Burgdorf, Offenbach-Rumpenheim; Peter Volz, Darmstadt; Werner Volkmar, Walsdorf; Rainer Seeger, Ober Ramstadt, all of Germany

[73] Assignee: Alfred Teves GmbH, Germany

[21] Appl. No.: 859,525

[22] PCT Filed: Oct. 4, 1991

[86] PCT No.: PCT/EP91/01891
 § 371 Date: Jul. 20, 1992
 § 102(e) Date: Jul. 20, 1992

[87] PCT Pub. No.: WO92/06875
 PCT Pub. Date: Apr. 30, 1992

[30] Foreign Application Priority Data

Oct. 17, 1990 [DE] Germany ............... 40 32 873.2
May 25, 1991 [DE] Germany ............... 41 17 098.9
Jun. 29, 1991 [DE] Germany ............... 41 21 579.6

[51] Int. Cl.⁶ ............... B60T 11/16; B60T 8/14; B60T 8/38
[52] U.S. Cl. ............... 303/113.1; 60/589; 137/614.19
[58] Field of Search ............... 303/50, 52, 61, 113.1, 303/114.1, 84.2; 60/589, 586, 592; 137/614.19, 506; 251/210

[56] References Cited

U.S. PATENT DOCUMENTS

| | | | |
|---|---|---|---|
| 3,171,440 | 3/1965 | Napolitano | 251/210 X |
| 3,836,207 | 9/1974 | Belart | 303/61 X |
| 4,828,333 | 5/1989 | Reinartz et al. | 303/52 X |
| 5,050,382 | 9/1991 | Burgdorf et al. | 60/589 |

FOREIGN PATENT DOCUMENTS

| | | |
|---|---|---|
| 2573709 | 5/1986 | France . |
| 3627000 | 2/1988 | Germany . |
| 3641712 | 6/1988 | Germany . |
| 3932248 | 4/1990 | Germany . |
| 2181949 | 8/1987 | Japan . |
| 2181950 | 8/1987 | Japan . |
| 3116971 | 5/1988 | Japan . |
| 2193771 | 2/1988 | United Kingdom . |

*Primary Examiner*—Jobie A. Ballato
*Attorney, Agent, or Firm*—Ratner & Prestia

[57] ABSTRACT

A master brake cylinder for an anti-locking hydraulic brake system is provided, comprising a central valve provided in each piston. The central valve comprises a first valve and a second valve. The opening distance A of the first valve is smaller than the opening distance B of the second valve. The first valve is made of a metallic material while the closure member of the second valve is made of a soft-elastic material, such as a rubber ring 40. Being made of a hard material, the first valve can perform a pressure regulating function, involving, however, the risk that dirt particles contained in the pressure fluid, are forced into the valve ball and the valve seat, respectively, thereby preventing the valve from closing completely. In such an event, at least the closing function of the central valve is performed by the second valve. To a limited extent, the second valve also can take over a pressure control function.

55 Claims, 6 Drawing Sheets

MASTER CYLINDER WITH TWO INTERNAL VALVES

FIELD OF THE INVENTION

The present invention is concerned with a master brake cylinder for an anti-locking hydraulic brake system and the valve sequence associated with the cylinder.

BACKGROUND OF THE INVENTION

A brake system of this type has been disclosed, for example, by German Offenlengungsschrift DE-OS 36 27 000.

The brake system comprises a master brake cylinder to which wheel brakes are connected through brake conduits. Associated with the wheel brakes are inlet and outlet valves, with the inlet valves controlling pressure fluid flow through the brake conduits and the outlet valves controlling pressure fluid flow through the connection of the wheel brakes to a pressure fluid reservoir. Moreover, pumps are provided that deliver pressure fluid from the reservoir to the working chambers of the master brake cylinder.

The master brake cylinder is provided with central valves controlling the communication between the working chambers of the master brake cylinder and the pressure fluid reservoir. As long as the master brake cylinder is inoperative, the central valves are open so that the brake circuits connected to the working chambers are in communication with the pressure fluid reservoir. A pressure and volume balance can take place at any time. Upon actuation of the brake pedal, the central valves are closed so that the brake circuits are hydraulically isolated from the reservoir, thereby enabling pressure to build up in the brake circuits.

However, the central valves, in addition, perform a control function.

During an anti-locking control operation, the pumps deliver pressure fluid from the reservoir into the master brake cylinder, with the working pistons of the master brake cylinder being restored until the central valves open. Any excessive pressure fluid that cannot be accommodated by the brake circuits is passed to the reservoir, with the central valves operating as control valves adjusting the pressure in the brake circuits in proportion to the pedal force. During this control operation, the central valves open and close in rapid sequence. Such valves are, therefore, required to be of a special design.

Central valves are known in the art wherein at least one element (either the valve body or valve seat) is made of a soft, elastic material. However, central valves of this type will be used only to hydraulically block the brake circuits upon commencement of a deceleration operation. They are not suitable to be used as control valves as the soft, elastic material (e.g. rubber), during closing, would be forced by the volume flow into the opening to be closed and sheared through the pressure increase in the working chamber between the stop face of the valve and the sealing face.

However, valves of this type are relatively insensitive to contamination, as dirt particles in the hydraulic fluid, which, although forced into the rubber, are hermetically enclosed by the rubber so that the closing operation is not affected thereby. Moreover, such valves exhibit a relatively high resistance to wear and damage of the sealing geometry with no functional loss.

When such valves are used as control valves, it is necessary for the valve body and valve seat to be made of a hard material such as steel. However, such materials have the disadvantage that the dirt particles affect or destroy the surfaces of valve body and valve seat, preventing the valve from closing completely. The valves will, therefore, have to be provided with filters for filtering the dirt particles out of the hydraulic fluid.

Filters of that type are difficult to mount. They require large mounting spaces and are made of expensive material.

SUMMARY OF THE INVENTION

It is the object of the present invention to provide central valves for the master brake cylinders of an anti-locking brake system that are able to perform a pressure control function, insuring a redundant, uniform and safe way of operation and being suitably employed without the need for additional filter elements.

This object is achieved in that the central valve comprises series connected and successively closing first and second valves. Upon actuation of the pedal, first the former valve is closed and then the latter valve is closed.

The first valve comprises metallic elements and, primarily, performs the sealing and, usually, the controlling functions.

The second valve comprises at least one soft, elastic part and performs the sealing function if the first valve is no longer able to perform this function because of contaminations in the hydraulic fluid or damage caused thereby.

Structural modifications of these valves are possible. In the case of a failure of the first valve, it is important for the second valve to insure that the brake circuits can be hydraulically blocked, thereby safeguarding at any time a non-controlled deceleration.

According to another embodiment of the invention, a different type of construction of the master brake cylinder can be manufactured at particularly low costs, with only one single central valve being provided, the valve seat and/or valve body of which are made of a soft, elastic material. However, coupled ahead of the central valve, in the path from the working chamber to the reservoir, is a diaphragm. The diaphragm, on which a pressure difference builds up during the pressure fluid return flow in the control operation, decreases the pressure in the interval against which the actual central valve opens. This measure enables the use of a rubber central valve in an anti-locking brake system.

To provide a compact dual central valve without placing any high requirements upon the manufacturing tolerance, it is suggested that the valve seats of the single valves—based on the axis of displacement of the working piston—are at approximately the same level and that the radial extension of the valve seat of the one valve is smaller than the radial extension of the valve seat of the other valve.

Moreover, it is suggested that the valve seat of the first valve made of a metallic material is of a smaller diameter than the valve seat of the second valve, the valve seat or valve body of which is made of a soft, elastic material.

This arrangement, compared to the master brake cylinder according to the afore-mentioned German Offenlegungsschrift, provides the advantage that the valve with the soft, elastic seat joins the pressure chamber of the master brake cylinder. This will improve both the opening and the closing patterns.

Figure 2:
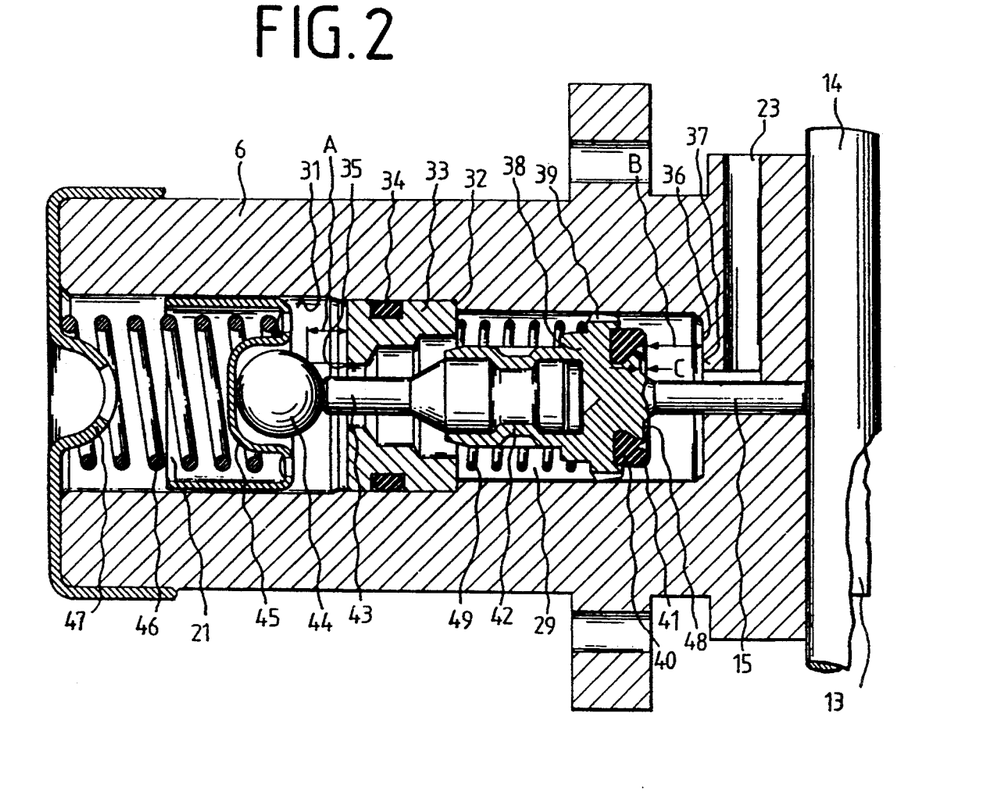
FIG. 2 is an enlarged, partial cross-sectional view of a piston of the master brake cylinder as shown in FIG. 1.

The design of the second valve is illustrated in FIG. 2 of German Gebrauchsmuster G 88 122 81 which describes a central valve including a single valve, with the valve seat made of a soft, elastic material. The valve body comprises a disc provided with a peripheral groove forced into the soft, elastic material. Moreover, an elongated pin is provided which is connected to the disc and is in abutment with a stop pin.

In providing another (first) valve, it is suggested that the valve body of the other (first) valve be guided on the actuating pin of the valve body of the second valve.

The valve body of the first valve may be of a semispherical configuration or in the form of a punched disc.

Moreover, an actuation of the first valve can be effected directly through the afore-mentioned stop pin or through an adjustable stop on the valve seat of the second valve, with the stop, preferably, being of a sleeve-type configuration which is capable of being pushed on and fixed to the actuating pin of the second valve.

The afore-mentioned Gebrauchsmsuter teaches connecting the soft, elastic material to the working piston. For that purpose, a holding sleeve is provided.

A further simplification is attainable if the soft, elastic material is placed into a groove of the valve body of the second valve. To prevent the soft, elastic material from spreading under pressure, the material, preferably a rubber ring of square cross-section, should be completely enclosed from three sides.

The rubber ring is connected, in a form and/or material-locking manner, to the valve body. In rubber-type materials it will be possible to provide, for example, a vulcanization.

The principle of the invention will be explained hereinafter in greater detail with reference to nine figures.

DETAILED DESCRIPTION OF THE DRAWINGS

Figure 1:
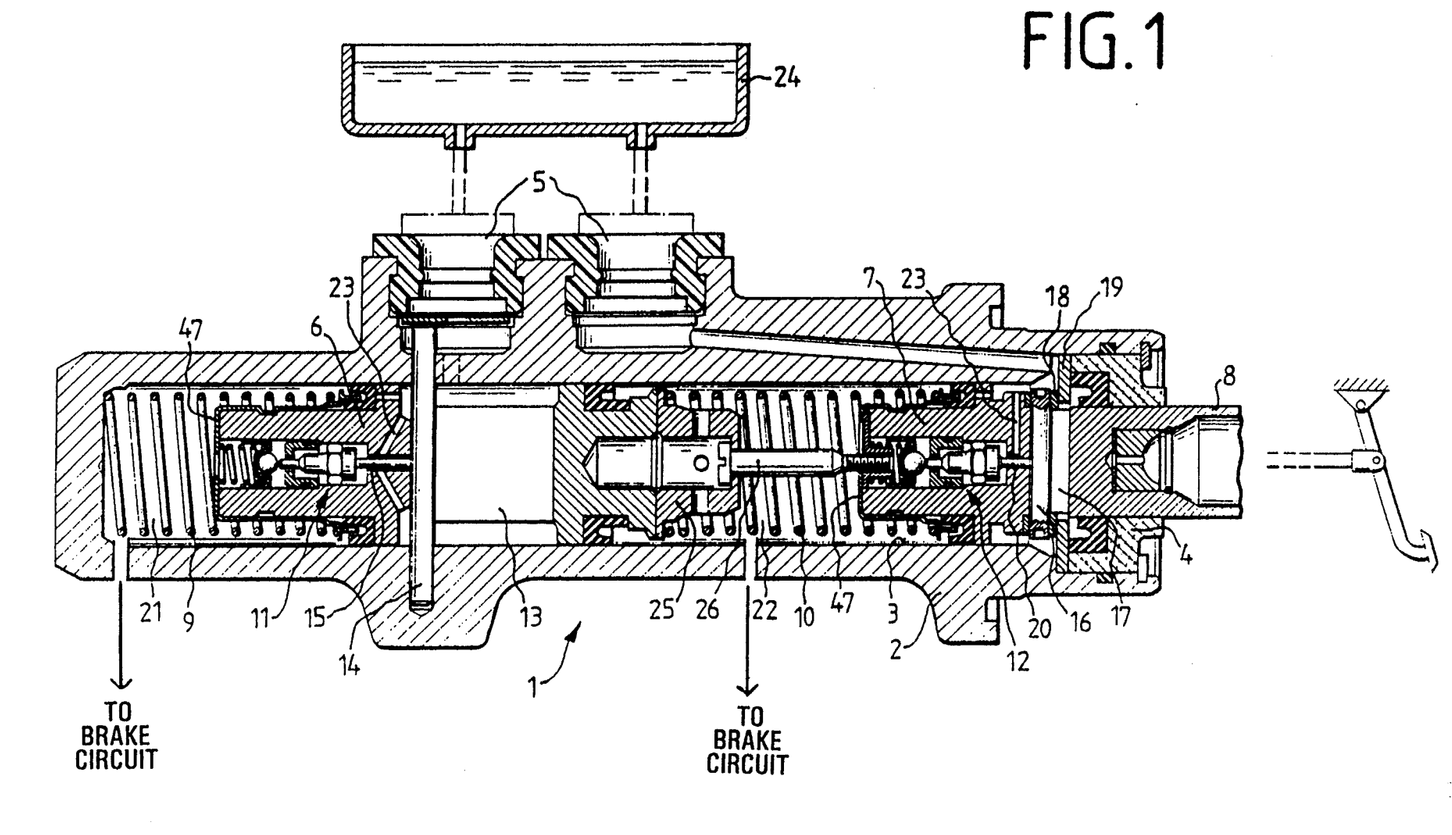
FIG. 1 is a partial cross-sectional view of a master brake cylinder having a central valve assembly according a first embodiment of the present invention.

Referring to FIG. 1, master cylinder 1 comprises a casing 2 having a blind-end bore 3, the open end of which is sealed by a plug 4. Moreover, the casing 2 comprises two connections 5 to a pressure fluid reservoir 24. A floating piston 6 and a push rod piston 7 are sealingly guided within the bore.

A section 8 of the push rod piston 7 is sealingly guided outwardly through plug 4. Supported on the section 8 is the push rod of a pedal (schematically shown). A first spring 9, on the one hand, is supported on the bottom of the bore 3 and, on the other hand, is supported on the floating piston 6. A second spring 10 is provided between the floating piston 6 and the push rod piston 7.

Disposed in pistons 6 and 7 are central valves 11, 12, respectively. A more detailed description of the central valves will be given in connection with FIG. 2. The two pistons 6 and 7 are each provided with a slot 13 and 17, respectively. The slots are in the form of an oblong holes extending transverse to the axis of the piston and connecting opposite cylindrical areas of the piston.

Extending through the slot 13 of the floating piston 6 is a transverse pin 14 rigidly anchored to the casing.

Spring 9 urges the floating piston 6 against the pin 14, thereby defining the basic position of this piston. A plunger 15 extends axially of the piston and serves, as described hereinafter, to actuate the central valve 11. Plunger 15 is in abutment with the transverse pin, keeping the central valve 11 open.

A similar pin 16 is inserted into the slot 17 of the push rod piston 7. It is secured to a ring 18 sliding on the section 8 of the push rod piston 7. The ring 18 is in abutment with a disc 19 supported on plug 4. Spring 10, between the pistons, forces the push rod piston against the pin 16, with the ring 18 being in abutment with the stop disc 19, thereby defining the basic position of the push rod piston 7. A plunger 20 extends axially of the push rod piston 7, serving to actuate the central valve 12. In the basic position of the piston 7, the plunger 20 is in abutment with the transverse pin 16, keeping the central valve open.

The pistons define two working chambers 21 and 22 which are in communication with the brake circuits and the output of the pump.

Reference is to be made to the captivation between the two pistons comprising a counterpart 25 and a spacer 26 which, with the head thereof, is in engagement with the counterpart 25, thereby defining a maximum distance between the two pistons.

The plungers 15 and 20 are guided in narrow elongated bores serving at the same time for the pressure fluid exchange between the working chambers 21, 22, on the one hand, and the reservoir 24, on the other hand. To enable a smooth pressure fluid balance to take place, equilibrium bores 23 may be provided within the pistons which extend substantially in a direction transverse to the longitudinal axis of the pistons. Alternatively, plungers 15 and 20 may be provided with elongated grooves.

Now, a detailed description of a central valve 11 and 12, respectively with reference to FIG. 2 will follow:

A part of pistons 6 and 7, respectively, is shown, which accommodates the central valve. Shown at the right-hand edge of FIG. 2 are the transverse pins 14(16), respectively.

The pistons 6(7), respectively, are provided with a multiple stepped elongated bore 31 extending from the front side confining the respective working chamber 21(22) to slot 13 and 17, respectively. The largest step of the elongated bore is contained in the direct connection to the front side of the working chamber. The section terminates at a step 32 on which is supported a cylindrically shaped insert 33. The insert is provided with a seal 34 sealing the insert on the outer cylindrical surface, thereby permitting a flow of fluid pressure only through the central passageway of the insert 33. The element also can be sealingly forced into the bore on the basis of a specific outer contour. The central channel at the end facing the working chamber 21(22) is provided with a hardened sealing seat 35.

Starting from insert 33, another section of the elongated bore 31 extends to a second step 36 which exhibits an annular face serving as a sealing face 37 for the second valve. The second step 36 is joined by a closing passageway in which the actuating plunger 15(20) is guided. Also the equilibrium bore 23 branches from that passageway, thereby enabling the passageway, at least in partial areas, to be of a very narrow configuration thus being able to serve as a guide for the plungers 15(20).

Provided in the space between the first step 32 and the second step 36 is a support member 38 on which is formed plunger 15(20). The diameter of the support member 38 substantially corresponds to the diameter of this section of the elongated bore 31, thereby providing a guide. A pressure fluid flow past the support member 38 is realized by passageway 39 on the outer edge of the support member 38. Provided on an annular face of the support body 38 facing the second step 36, within a groove, is a sealing ring 40 which can be placed in abutment with the step 36 and the sealing face 37, respectively. The annular face comprises a stop face 48 which can be placed in abutment with step 37. The sealing ring 40 is provided with a bead 41 extending beyond the abutment face 48 at a distance C. The distance C corresponds to the axial extension of the bead 41 past stop face 48.

The support member 38 has a blind-end bore opening toward the end facing away from pin 14(16). Plugged into that bore is an actuating pin 43 which, through a reduced diameter section 42, is rigidly connected to the valve carrier 38. This arrangement enables an adjustment to be made before support member 38 and pin 43 are squeezed together, in that actuating pin 43 is displaced within the bore of the support member 38. The pin 43 protrudes through the central passageway of the insert 33 and is in abutment with a valve ball 44 cooperating with the valve seat 35. The valve ball 44 is held by a guiding element 45 on which a spring 46 is supported. The spring 46, on the other side of the guiding element 45, is supported on a sleeve 47 mounted on the piston 6(7) (see also FIG. 1). Also, it should be noted that supported between the insert 33 and the valve carrier 38 is a spring 49 which insures, as does spring 46, a safe closing of the respective valve.

The connection of the valve body 38 to the actuating pin 43 is such that, in the basic position of the central valve, the first valve formed by valve ball 44 and valve seat 35, exhibits an opening distance A, while the second valve formed of sealing ring 40 or bead 41 and sealing face 37, exhibits an opening distance B. Distance A is smaller than distance B.

The operation of the master brake cylinder is as follows:

FIGS. 1 and 2 show the master brake cylinder and the central valve, respectively, in a non-actuated situation. Pistons 6 and 7 are in their basic position; plunger 15 or 20 is disposed in abutment with the respective transverse pin 14 or 16, respectively, such that the valve seats 35 and 37 formed on the piston are at a space from their valve bodies 44 and 48, respectively. A pressure fluid communication is established between the working chambers 21 and 22 and the reservoir 24.

Once the pedal is actuated, the push rod piston 7 displaces under the influence of the pedal force, in accordance with the illustration, to the left, driving the floating piston 6 through the spring 10. Hence, the pistons are displaced relative to the casing, while plunger 15 or 20, respectively, valve carrier 38, actuating pin 43 and valve body 44 are not displaced relative to the casing of the master brake cylinder. Springs 46 and 49 hold the valve bodies in their positions. Once the pistons 6,7 have covered the distance A, valve seat 35 comes into abutment with the valve ball 44 so that the afore-mentioned connection between the working chambers 21 and 22, on the one hand, and the reservoir 24, on the other hand, is discontinued. Upon a further displacement of the pistons, a pressure can now develop in the working chambers 21, 22.

Once the working pistons are moved further to the left, the actuating pin 43 is separated from the valve ball 44, with the valve seat 37 approaching the bead 41. Once the piston 6 or 7, respectively, has covered a total distance B, then the second valve will also close. This is effected in non-pressurized condition as no pressure develops in the interval 29 between the two single valves after the first valve closes. Hence, no damage is done to the rubber ring 40.

As long as the first valve 44, 35 safely closes, the behavior of the second valve is of no relevance.

In a control operation, where pressure fluid is delivered by the pump to the working chambers 21, 22, the working pistons are restored to their basic positions. Then the second valve 40, 37 first reopens and, subsequently, the first valve 44, 35 reopens. Now, pressure fluid through the opening first valve can flow past the open second valve, with the opening gap being B minus A. The adjusting low pressure decrease in the working chambers 21, 22 results in that the working pistons are, again, moved to the left, with the first valve closing. Consequently, a control process takes place which consists of fast successive opening and closing operations of the first valve. Then, virtually, as much pressure fluid can flow off through the valve as is delivered by the pump to the master cylinder, with the master cylinder pressure corresponding to the pedal force.

As the pressure fluid is substantially unfiltered (the present embodiment does not provide for any filter), dirt particles may deposit between the valve ball 44 and the valve seat 35. Such dirt particles may become lodged into the surface of the ball or of the valve seat for which reason they are not able to readily flow off. At the same time, they prevent the valve from closing entirely. The sealing function of the first valve, hence, can be restricted or fail entirely. Its function will now be taken over by the second valve, with the closed leaky first valve considerably throttling the volume flow such that the bead 41 of the sealing ring 40 no longer can be drawn and squeezed between the stop 48 and the sealing surface 37.

In a non-controlled deceleration, admittedly, also the former valve first closes; however, in view of its inoperability, the connection between the working chambers 21, 22 and the reservoir 24 will not be closed. Only after distance B has been covered does second valve close, insuring a hydraulic blocking of the brake circuits.

A contamination of the second valve is not so critical as the dirt particles are accommodated and enclosed by the soft rubber, thereby insuring that even in the event of a failure of the first valve a pressure build-up in the brake circuits will be possible.

Also the second valve, to a certain extent, can perform a control function. However, in that case, the opening and closing operations will be under pressure so that damage to the rubber due to flow and squeeze operations cannot be eliminated. Nevertheless it can be assumed that the rubber will survive at least a small number of control operations.

Figure 3:
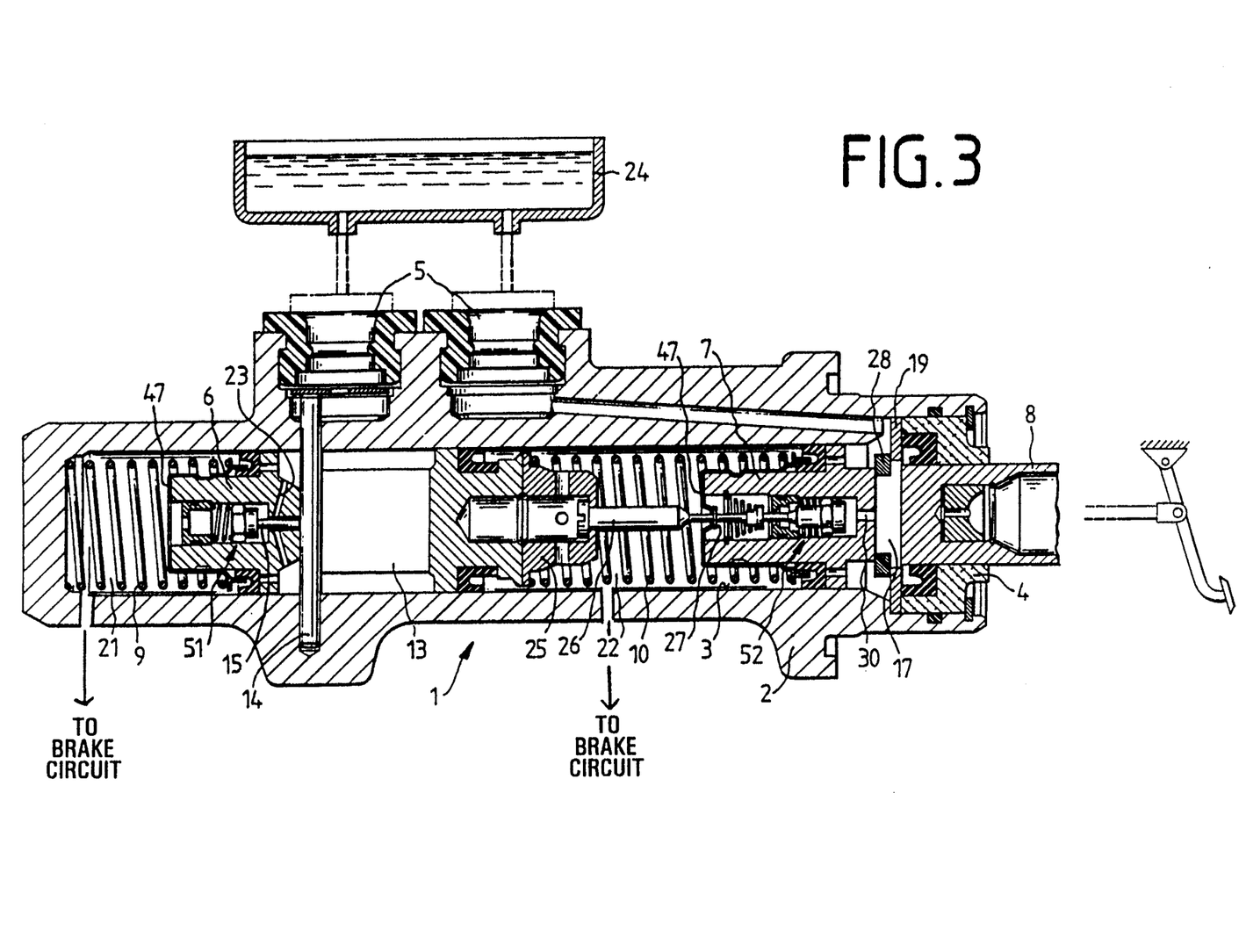
FIG. 3 is a partial cross-sectional view of a master brake cylinder having a central valve assembly according a second embodiment of the present invention.

The master brake cylinder 1 as shown in FIG. 3 comprises a housing 2 having a blind-end bore 3, the open end of which is sealed by a plug 4. Moreover, the housing 2 has connections 5 for a supply tank 24. A floating piston 6 and a push rod piston 7 are sealingly guided in the bore.

A section 8 of the push rod piston 7 is sealingly guided outwardly through the plug 4. The push rod of a pedal (schematically shown) is supported on section 8. A first spring 9, on the one hand, is supported on the bottom of the bore 3 and, on the other hand, on the floating piston 6; a second spring 10 is provided between the floating piston 6 and the push rod piston 7.

Disposed in the two pistons 6 and 7 is respectively one central valve 51, 52. A more precise description of the central valves 51, 52 is given in connection with FIGS. 4 and 5. Each of the pistons comprises one slot 13 and 17, respectively. The slots 13, 17 are configured as oblong holes, extending transversely of the piston and interconnecting opposite cylindrical surfaces of the piston. Inserted into the slot 13 of the floating piston 6 is a transverse pin 14 rigidly connected to the housing.

The spring 9 forces the floating piston 6 against the pin 14, thereby defining the basic position of the piston. A plunger 15 extends axially of the piston, serving, as set out hereinafter, to actuate the central valve 51. The plunger 15 is in abutment with the transverse pin 14, keeping the central valve 51 open in the resting position as shown.

Figure 4:
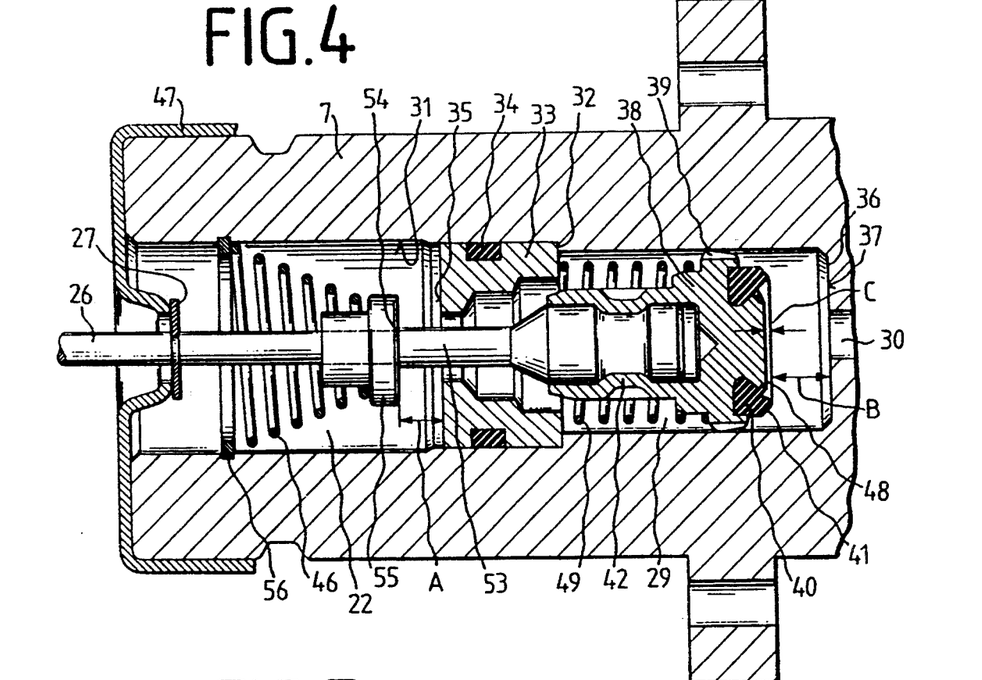
FIG. 4 is an enlarged, partial cross-sectional view of the push rod piston of the master brake cylinder as shown in FIG. 3.

Secured to the floating piston 6 is a counterpart 25 which together with the spacer 26, the disc 27 fixed thereto and the sleeve 47 fixed to the push rod piston 7, captivates the push rod piston 7 to the floating piston 6 (see also FIG. 4). Simultaneously with the captivation, the spring 10 is thus preloaded between the sleeve 47 and counterpart 25 in the resting position as shown. Counterpart 25, spacer 26 and the position of the disc 27 on the spacer 26 are dimensioned such that the spring 10 forces the push rod piston 7 through the ring 28 against the stop disc 19 rigidly connected to the housing.

The ring 28 is arranged in side-by-side relationship with the slot 17, with the latter forming a part between the connecting channel extending from the reservoir 24 past the central valve 52 to the working chamber 22 between the two pistons 6,7. An axial channel 30, the outlet of which can be closed by the central valve 52, leads from the slot 17 to the central valve 52.

Provided in the floating piston 6, which together with the end of the bore 3 confines another working chamber 21, are two oblique equilibrium bores 23 insuring the pressure fluid flow from the supply tank 24 to the central valve 51.

The two central valves 51, 52 will now be described in greater detail with reference to FIGS. 4 and 5.

FIG. 4 shows the push rod piston 7, partly in enlarged scale. To the right thereof, there is shown a section of the axial channel 30. The piston 7 is provided with a multiple stepped elongated bore 31 extending from the front side facing the working chamber 22 to the slot 17. The largest step of the elongated bore is provided in the immediate connection to the front side of the working chamber. That section terminates in a step 32 on which is supported a cylindrically shaped insert 33. The insert 33 is provided with a sealant 34 sealing the insert 33 on the outer cylindrical surface, thereby permitting pressure fluid to flow only through the central passageway of the insert 33. The insert 33 can be sealingly forced into the bore through a special external contour. The central channel on the end facing the working chamber 22 is provided with a sealing seat 35. Starting from insert 33, another section of the elongated bore 31 extends to a second step 36 comprising an annular surface which serves as a sealing face 37 for the second valve. The second step 36 is joined by the axial channel 30.

Provided in the interval 29 between the first step 32 and the second step 36 is a carrier body 38. The diameter of the carrier body 38 substantially corresponds to the diameter of that section of the elongated bore 31, thereby providing a guide. A pressure fluid flow past carrier body 38 is realized through passageways 39 on the outer edge of the carrier body 38. A sealing ring 40 is provided, within a groove, on an annular face of the carrier body 38 facing the second step 36, with the sealing ring being capable of being placed in abutment with the step 36 and the sealing face 37, respectively. The annular face comprises a stop face 48 that can be placed in abutment with step 36. The sealing ring 40 comprises a bead 41 protruding beyond the stop face 48 by the distance C. The distance C corresponds to the axial extension of the bead 41 past sealing stop face 48.

The carrier body 38 comprises a blind-end bore opening toward the end facing away from the sealing ring 40. Plugged within the bore is a cylindrical extension 53 which, through a clamping means 42, is rigidly connected to the valve carrier 38. This arrangement enables an adjustment to be made before the carrier body 38 and the extension 53 are squeezed together, in that the extension 53 is displaced within the bore of the carrier body 38. The extension 53 protrudes through the central channel of the insert 33, passing to the spacer 26. Formed on the extension 53 is an additional step 54 against which is forced the metallic valve body 55 of the first valve by the valve spring 46. The valve body 55 is axially displaceable on the thinner portion of the extension 53. Also, it should be noted that supported between the insert 33 and the valve carrier 38 is a spring 49 which insures as does spring 46 loaded between the valve body 55 and a locking ring 56, that the respective valve reliably closes.

The connection of the valve body 38 to the extension 53 is such that, in the basic position of the central valve, the first valve formed of valve body 55 and valve seat 35, comprises an opening distance A while the second valve formed of the sealing ring 40 or the bead 41 and the sealing face 37, comprises an opening distance B. The distance A is smaller than the distance B.

Figure 5:
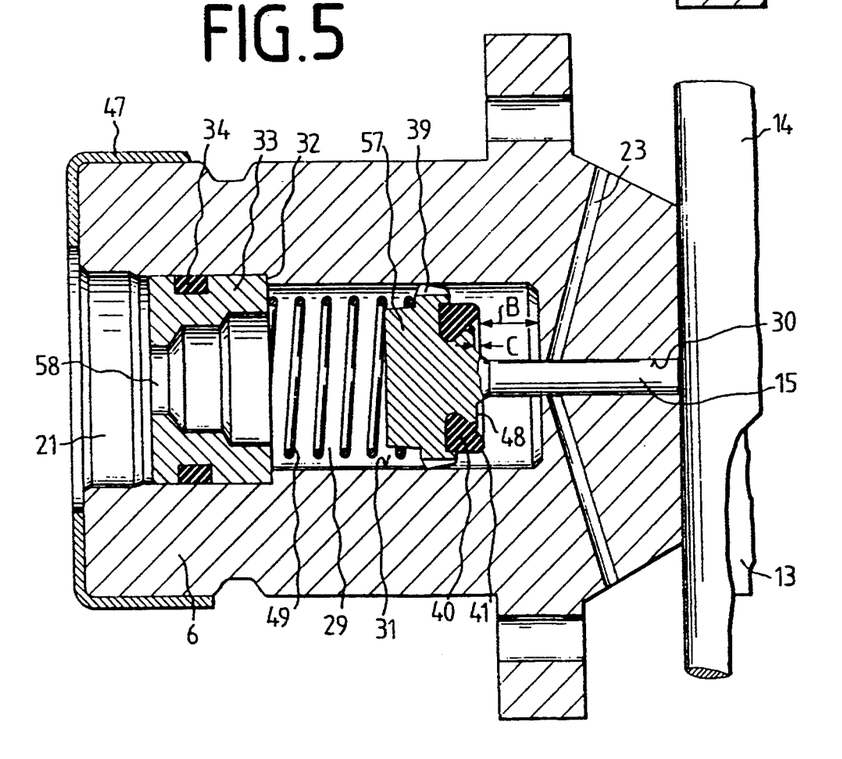
FIG. 5 is an enlarged, partial cross-sectional view of the floating piston of the master brake cylinder as shown in FIG. 3.

The single central valve 51 in the floating piston 6 as shown in FIG. 5 is almost identical with the second valve described above. The central valve 51 comprises a valve carrier 57 guided in the elongated bore 31, with the passageways 39 remaining clear. Formed on the valve carrier 57 is a plunger 15 cooperating with the pin 14 and keeping open the central valve 51 in the resting position. The plunger 15 is configured so that pressure fluid can flow past it in the axial channel 30.

Formed within the insert 33 is a diaphragm 58 only permitting a limited pressure fluid flow, thereby insuring, during restoring of the piston 6, a pressure difference between the working chamber 21 and the interval 29. The central valve 51 will then only have to open against the lower pressure prevailing in the interval 29 without doing damage to the bead 41 of the sealing ring 40.

The operation of the master brake cylinder corresponds to the operation as described above.

Figure 6:
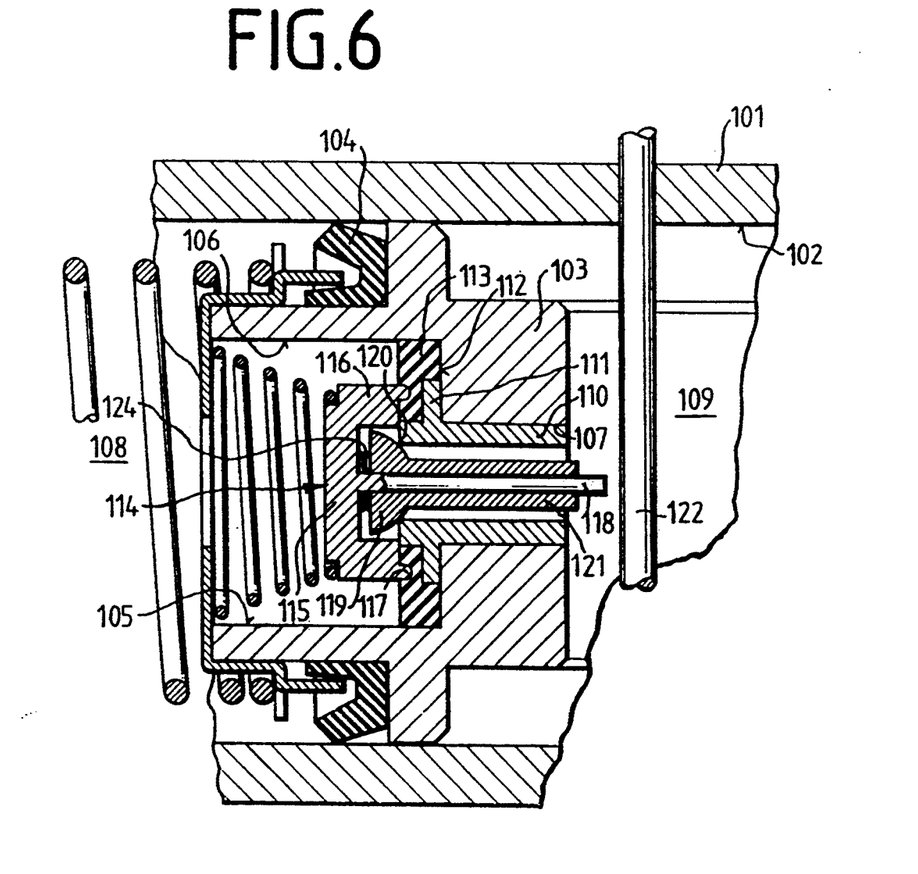
FIG. 6 is a partial cross-sectional view of a piston having a central valve assembly according to a third embodiment of the present invention.

FIG. 6 shows a master brake cylinder housing 101 comprising an elongated bore 102 in which the working piston 103 is sealingly guided. The sealing is effected by means of a sealant 104 on the cylindrical surface of the working piston 103.

The working piston 103 confines by one of its front sides (the left-hand one in the drawing) a pressure and working chamber 108 and with the other front side thereof (the right-hand one in the drawing) confines a supply chamber 109 which is in permanent pressure fluid communication with a pressure fluid reservoir (not shown).

The working piston 103 comprises a central stepped bore 105 the axis of which is identical to the axis of the working piston. The area 106 of larger cross-section joins the pressure chamber 108, while the area 107 of smaller cross-section terminates in the supply chamber 109.

The transition between the two areas is via a step comprising an annular face 112 normal to the longitudinal axis. A sleeve 110 is inserted onto the area 107 of smaller diameter which sleeve, at one end, is in flush with the piston front face and, at the other end, in part, protrudes into the area 106 of larger diameter. The inner diameter of the sleeve 110 corresponds to the inside diameter of the area 107 of smaller cross-section.

The sleeve 110 comprises a collar 111 of rectangular cross-section, which extends radially outwardly in a direction vertical to the longitudinal axis of the sleeve. With one side thereof, the collar is in alignment with the annular face 112. There is a distance between the other side of the collar 111 and the end of the sleeve which protrudes into the area 106 of larger cross-section.

Disposed in the area between the sleeve, the interior wall of the area 106 of larger cross-section and the annular face 112 or the collar 111 is a substantially annular sealant 113. The sealant directly joins the boundary surfaces of the above three elements so that only one side of the annular sealant 113 extending in a direction normal to the longitudinal axis, joins the area 106 of larger cross-section.

The valve body 114 leading to the annular sealant 113 comprises a disc 115 provided with an annular collar 116 on the periphery thereof, with the collar carrying a circumferential nose 117 that can be forced into the soft-elastic material of the annular sealant 113. The collar 116 is in abutment with the sleeve 110. The valve body 114 is located in the area 106 of larger cross-section. Connected to the disc 115 is a pin 118 extending from the center of the disc 115 along the longitudinal axis through the sleeve 110 into the supply cheer 109. The pin 118 as shown in FIG. 6, may be integrally formed with the disc 115 or can be connected thereto as by rivets or screws. The afore-described valve is designated as the second valve.

The sealing seat 120 of the first valve is formed by the inner edge of the sleeve 110 which is in abutment with the end protruding into the area 106 of larger cross-section.

The valve body is of a semi-spherical configuration 119, the curved area of which can be placed in abutment with the sealing seat 120. In lieu of a semispherical configuration, other shapes, such as cones or balls, may be provided.

The semi-spherical configuration 119 is provided with a central bore through which the pin 118 is suitably guided. Moreover, seated on the pin 118 is a sleeve-type pin 121 which, according to FIG. 6, is connected to the semi-spherical configuration 119. The pin also protrudes into the supply chamber 109, however, not to the same extent, relative to the front side of the working piston 103, as does pin 118.

Coaxially disposed between the valve bodies is a spring 124.

Figure 7:
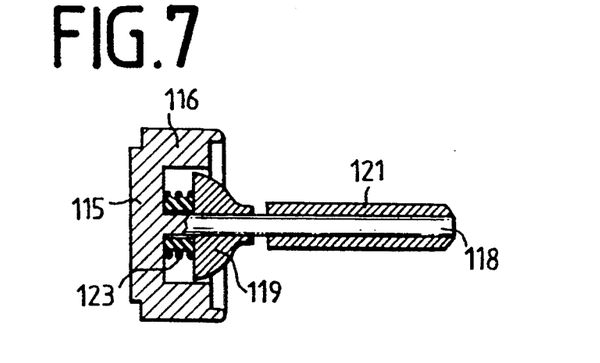
FIG. 7 is a partial cross-sectional view of a portion of a central valve assembly according to a fourth embodiment of the present invention.

According to FIG. 7, the sleeve-type pin 121 may be separate from the semispherical configuration 119 and is displaceable on, yet fixable to, the pin 118, with a gap being provided between the semispherical configuration 119 and the sleeve-type pin 121, causing the pin 122 to form a stop.

FIG. 7 shows another alternative. The spring 124 according to FIG. 6, in this embodiment, is formed as a rubber spring 123. It is of sleeve-type configuration and is coaxially disposed on the pin. At the same time, it serves to seal the gap between the pin 118 and the bore of the valve body 119 in a pressure fluid-tight manner.

Figure 8:
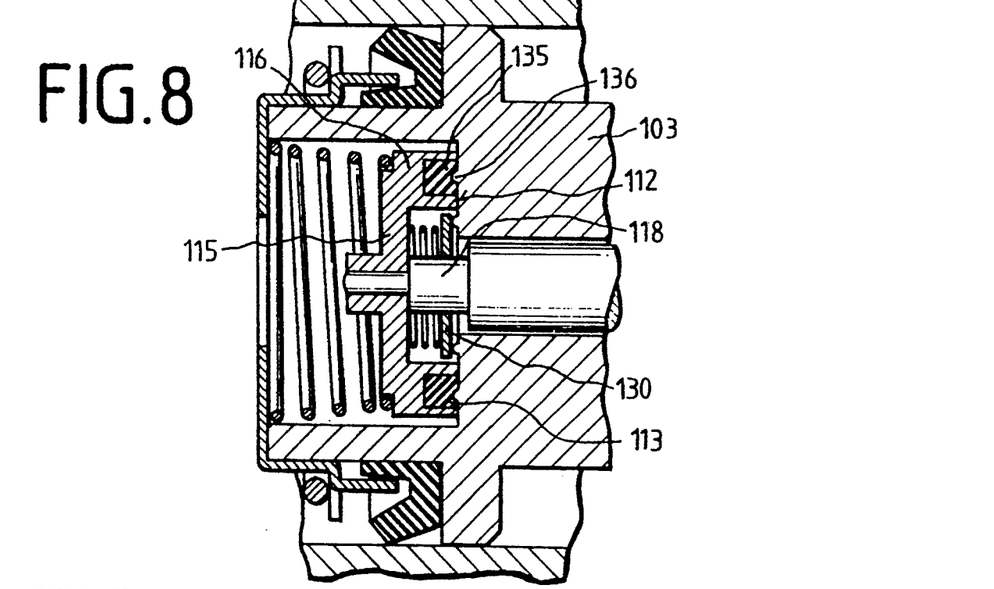
FIG. 8 is a partial cross-sectional view of a piston having a central valve assembly according to a fifth embodiment of the present invention.

Referring to FIG. 8, this embodiment differs in two respects from FIGS. 6 and 7, respectively. The closure member of the first valve is formed as an annular disc 130 and is seated on the pin 118 of the second valve which, in this embodiment, is connected to plate 115 by rivets.

Another modification resides in that the soft-elastic sealing ring 113 no longer is configured in a manner rigidly connected to the piston but is rather connected to the valve body of the second valve. For that purpose, a groove 135 is provided which is formed in the collar 116, opening in the longitudinal direction toward the annular face 112. The annular face 112, at the level of the groove, comprises a circumferential threshold 136.

The groove 135 accommodates the sealing ring 113, with the groove walls and the groove bottom enclosing the ring 113 from three sides. With the collar 116 in abutment with the annular face 112, the ring 113 is fully enclosed.

Figure 9:
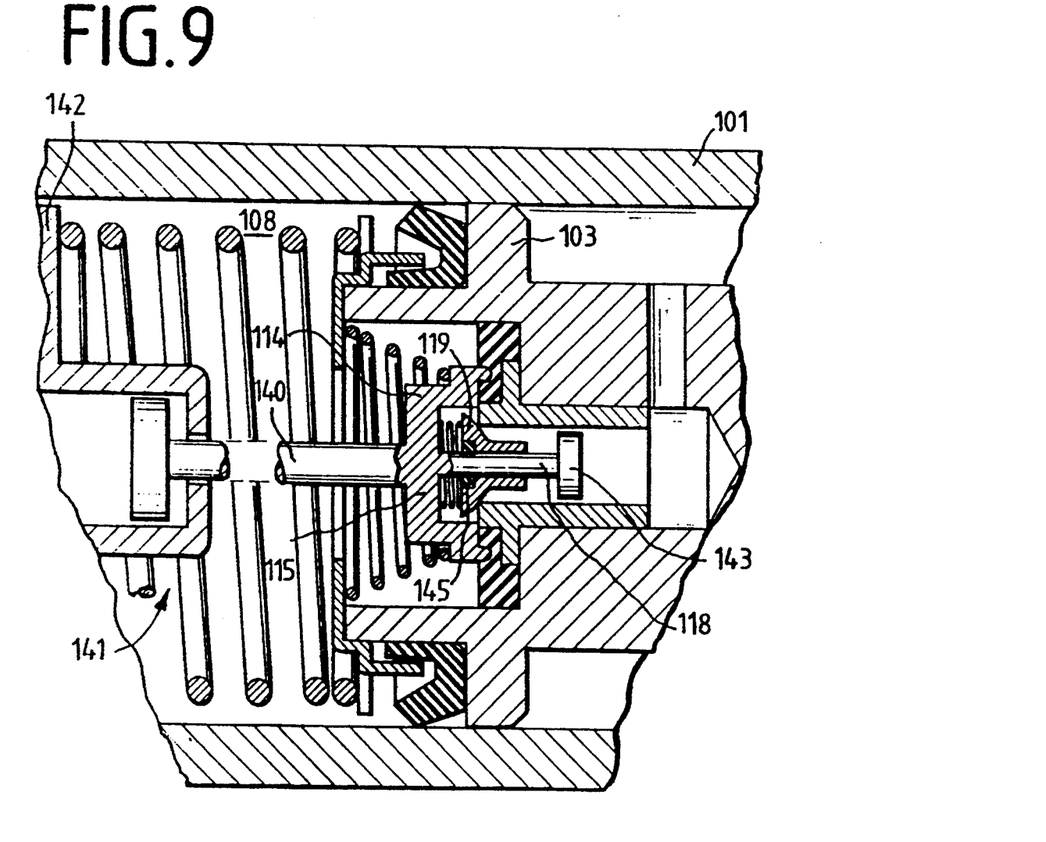
FIG. 9 is a partial cross-sectional view of a piston having a central valve assembly according to a sixth embodiment of the present invention.

FIG. 9 shows another embodiment for actuating the dual valve.

According to FIG. 6, a stop pin 122 is provided which extends in a direction transverse to the longitudinal axis of the master cylinder which is located in the supply chamber 109 and is anchored in the housing 101. The pin 118 and the sleeve-type pin 121 are adapted to be placed in abutment with the stop pin 122. In comparison, a captivating unit is provided according to FIG. 9. For that purpose, the valve body 114 of the second valve has another pin 140 which protrudes into the pressure chamber 108. The pin 140, through a captivating unit 141, is connected to a counterpart 142. This type of actuation of the central valve is well known in the art and need not be explained in any greater detail.

According to FIG. 9, the valve body 119 of the first valve, in sealed manner (sealant 145), is guided on the pin 118. This measure can also be taken in the embodiments of FIGS. 6 and 7.

Generally, this measure will not be needed as some minor leakage on the first valve is always permitted.

In the embodiment according to FIG. 9, the valve body 119 does not comprise an actuating member of its own as it does according to FIG. 1, but is rather driven, according to FIG. 9, through a stop 143 on pin 118.

The operation of the central valve is as follows. In FIGS. 6 and 9, the central valve is shown in a closed position, i.e. with the master brake cylinder actuated.

During a brake slip control, pressure fluid is supplied to the pressure chamber 108, thereby displacing the master cylinder piston 103 to the right as shown in the drawing. According to FIG. 6, this will place the pin 118 in abutment with the stop pin 122 so that the valve body 114 is separated from the sealing ring 113, thereby opening the second valve. Since the first valve is still closed, opening of the second valve is not under a high pressure gradient. Upon further displacement of the working piston 103, sleeve 121 also is placed in abutment with the stop pin 122, thereby causing also the first valve to open. According to FIG. 6, the valve body of the first valve is driven by the sleeve 121 fixed to the pin 118. Opening of the first valve is, in fact, under a high pressure gradient; however, as the valve is made of a metallic material, no damage is to be expected.

The embodiment according to FIG. 9 operates accordingly. The opening processes are accordingly performed through the means 140, 141, 142 and 143.

The second valve, hence, insures a safe closure of the pressure chamber 108 against the supply chamber 109 and the pressure fluid reservoir, respectively. The first valve insures a safe opening of the central valve even under pressure with no damage done to the second valve with the rubber sealant.

What is claimed:

1. A master brake cylinder for an anti-locking hydraulic brake system comprising a working piston confining a working chamber, with the working piston being displaceably guided for reducing the volume of the working chamber, further comprising a pressure fluid reservoir, a central valve provided in a first connection between the working chamber and the pressure fluid reservoir, which, in a basic position of the working piston corresponding to a non-actuated situation, keeps open the first connection and, upon displacement of the working piston, closes the first connection which comprises a second connection between the working chamber and an interval and a third connection, in series with the second connection, between the interval and the reservoir, characterized in that the central valve comprises:
   a first valve, comprising a first valve seat which is metal and a first valve closure member which is metal, for controlling the second connection; and
   a second valve, comprising a second valve seat and a second valve closure member, at least one of which is made of a soft-elastic material, for controlling the third connection, connected in series with the first valve, wherein the first valve closes before the second valve and the first valve and second valve successively close once the working piston is displaced.

2. A master brake cylinder according to claim 1, characterized in that the first valve and the second valve are formed in the working piston, with the first valve seat and the second valve seat being parts of the working piston.

3. A master brake cylinder according to claim 2, characterized in that the first valve seat is formed on an insert rigidly connected to the working piston.

4. A master brake cylinder according claim 2, characterized in that the first valve is configured as a poppet valve.

5. A master brake cylinder according to claim 1, characterized in that a cylindrical extension extending in the actuating direction is fixable to a carrier body of the second valve on which extension the first valve closure member is displaceably guided.

6. A master brake cylinder according to claim 5, characterized in that the central valve is configured as a captivated central valve and the extension is formed by a section of the captivating element.

7. A master brake cylinder according to claim 6, characterized in that a step is formed on the extension, against which step the first valve closure member is forced, in the resting position thereof, by means of a valve spring holding it in that position at a distance (A) from its sealing seat.

8. A master brake cylinder according to claim 5, characterized in that a slide fit is provided between the first valve closure member and the extension.

9. A master brake cylinder according to claim 8, characterized in that the first valve is configured as a disc-type valve.

10. A master brake cylinder according to claim 1, characterized in that a transverse pin is plugged through an elongated bore of the master brake cylinder, wherein an actuating plunger for the first valve and the second valve is placed in abutment with the transverse pin.

11. A master brake cylinder according to claim 10, characterized in that the second valve closure member is formed on a valve carrier on which is provided the actuating plunger capable of being placed in abutment with the transverse pin.

12. A master brake cylinder according to claim 11, characterized in that an actuating pin for the first valve and the valve carrier can be rigidly interconnected and that, before being connected, the actuating pin and the valve carrier are displaceable with respect to one another.

13. A master brake cylinder according to claim 10, characterized in that a valve carrier for the second valve is connected to an actuating pin for the first valve.

14. A master brake cylinder according to claim 1, characterized in that, in the basic position of the central valve, the first valve closure member is at a distance A from the first valve seat, and the second valve closure member is at a distance B from the second valve seat, with the distance A being smaller than the distance B.

15. A master brake cylinder according to claim 14, characterized in that the first valve closure member comprises a valve ball, and that the second valve closure member comprises a rubber-elastic ring vulcanized in a groove on the valve carrier.

16. A master brake cylinder according to claim 1, characterized in that the first valve seat and the second valve seat—based on the axis of displacement of the working piston—approximately lie at the same level, and that the radial extension of the first valve seat is smaller than the radial extension of the second valve seat.

17. A master brake cylinder according to claim 16, characterized in that the second valve closure member comprises an elongated pin, with the first valve closure member exhibiting an elongated bore through which said elongated pin is guided.

18. A master brake cylinder according to claim 17, characterized in that the first valve closure member is connected to an actuating pin configured as a sleeve and arranged about the elongated pin of the second valve.

19. A master brake cylinder according to claim 17, characterized in that the elongated pin of the second valve comprises a stop with which the first valve closure member can be placed in abutment.

20. A master brake cylinder according to claim 17, characterized in that a rubber spring provided between the first valve closure member and the second valve closure member is disposed on the pin and has a sealing function.

21. A master brake cylinder according to claim 16, characterized in that the first valve closure member is configured as a punched disc.

22. A master brake cylinder according to claim 1, characterized in that a soft-elastic ring is placed in a groove on the second valve closure member to be held therein in form- and/or material-locking manner.

23. A central valve assembly for use in a master brake cylinder of an anti-locking control hydraulic brake system having:
   (a) brake circuits,
   (b) a pressure fluid reservoir containing pressure fluid, and
   (c) a control pump for supplying pressure fluid during a control operation,
said master brake cylinder defining a working chamber in pressure fluid communication with said brake circuits and said control pump and having a piston movable in a first direction in response to movement of a brake pedal and in a second direction, opposite to said first direction, in response to pressure fluid from said control pump, said central valve assembly comprising:
   first pressure fluid flow control means including a first valve, having an opening distance, a metal valve body and a metal valve seat, and located within said piston in a fluid flow path extending between said pressure fluid reservoir and said working chamber and:
      (a) responsive to movement of said piston in said first direction for preventing pressure fluid flow between said working chamber and said pressure fluid reservoir, and
      (b) responsive to movement of said piston in said second direction for permitting pressure fluid flow between said working chamber and said pressure fluid reservoir during the control operation; and
   second pressure fluid flow control means including a second valve, having an opening distance greater than said opening distance of said first valve, a valve body and a valve seat, at least one of which is an elastic material, and located within said piston in series with said first pressure fluid flow control means in said fluid flow path extending between said pressure fluid reservoir and said working chamber and:
      (a) responsive to movement of said piston in said first direction for preventing pressure fluid flow between said working chamber and said pressure fluid reservoir, and
      (b) responsive to movement of said piston in said second direction for permitting pressure fluid flow between said working chamber and said pressure fluid reservoir during the control operation.

24. A central valve assembly in accordance with claim 23 wherein said second fluid flow control means respond to movement of said piston in said:
   (a) first direction for preventing pressure fluid flow between said working chamber and said pressure fluid reservoir after said first fluid flow control means respond to movement of said piston in said first direction for preventing pressure fluid flow between said working chamber and said pressure fluid reservoir, and
   (b) second direction for permitting pressure fluid flow between said working chamber and said pressure fluid reservoir during a control operation before said first fluid flow control means respond to movement of said piston in said second direction for permitting pressure fluid flow between said working chamber and said pressure fluid reservoir during said control operation.

25. A central valve assembly in accordance with claim 23 wherein said valve seat of said second valve is metal and said valve body of said second valve is said elastic material.

26. A central valve assembly in accordance with claim 23 wherein said first valve is a disc-type valve.

27. A central valve assembly in accordance with claim 23 wherein said first valve is a popper valve.

28. A central valve assembly in accordance with claim 23 wherein:
   said piston defines an elongated axial bore extending from said working chamber to a slot in pressure fluid communication with said pressure fluid reservoir, said axial bore including a largest bore extending from said working chamber to a first step, an intermediate bore extending from said first step to a second step, and a narrowest bore extending from said second step to said slot;
   said central valve assembly further comprises an insert, rigidly connected to said piston within said axial bore at said first step, on which insert is formed said valve seat of said first valve; and
   said valve seat of said second valve is located at said second step.

29. A central valve assembly in accordance with claim 28 further comprising:
   a carrier body located between said first step and said second step having said valve body of said second valve at the end closest to said second step and having a bore at its other end facing said first step;
   an actuating pin rigidly clamped within said bore of said carrier body extending axially through said first step towards said working chamber and in abutment with said valve body of said first valve when said first valve is open; and
   an actuating plunger rigidly clamped to said carrier body at the end closest to said second step and in abutment with a transverse pin when said second valve is open.

30. A central valve assembly in accordance with claim 29 wherein:
said valve body of said first valve is a valve ball;
said carrier body includes a groove at the end closest to said second step; and
said valve seat of said second valve is a rubber ring disposed within said groove.

31. A central valve assembly in accordance with claim 28 further comprising:
a carrier body located between said first step and said second step having said valve body of said second valve at the end closest to said second step and having a bore at its other end facing said first step; and
a cylindrical extension rigidly clamped within said bore of said carrier body extending axially through said first step towards said working chamber; and
wherein said valve body of said first valve is axially displaceably mounted on said cylindrical extension and is located within said largest bore.

32. A central valve assembly in accordance with claim 23 wherein:
said valve seat of said first valve and said valve seat of said second valve are disposed at the same axial position along said master brake cylinder and
said valve seat of said second valve extends radially outward relative to said valve seat of said first valve.

33. A central valve assembly in accordance with claim 32:
wherein said piston includes an oblong slot in pressure fluid communication with said pressure fluid reservoir, extending transverse to the axis of said piston and connecting opposite cylindrical sides of said piston, and said piston having a central stepped bore having a step, at which step said valve seat of said first valve and said valve seat of said second valve are located, said step having on one side said working chamber and on the other side a supply chamber in permanent fluid communication with said pressure fluid reservoir; and
wherein said master brake cylinder further comprises a casing and a transverse pin plugged through said slot and rigidly anchored to said casing; and
said central valve assembly further comprising:
(a) means, supported within the working chamber side of said central stepped bore:
(i) for biasing said valve body of said first valve towards said valve seat of said first valve, and
(ii) for biasing said valve body of said second valve-towards said valve seat of said second valve,
(b) an actuating pin coupled to said valve body of said second valve and extending axially towards said transverse pin to a first actuating distance away from said transverse pin when said second valve is closed, for opening said second valve upon abutment with said transverse pin, and
(c) an actuating sleeve, axially displaceably mounted on said actuating pin and coupled to said valve body of said first valve and extending axially towards said transverse pin to a second actuating distance away from said transverse pin when said first valve is closed, for opening said first valve upon abutment with said transverse pin;
wherein said first actuating distance is less than said second actuating distance, whereby said second valve opens before said first valve.

34. A central valve assembly in accordance with claim 33 further comprising a rubber spring disposed between said valve body of said first valve and said valve body of said second valve and surrounding said actuating pin for:
(a) sealing an annular gap between said actuating pin and said valve body of said first valve, and
(b) for biasing said valve body of said first valve towards said valve seat of said first valve.

35. A central valve assembly in accordance with claim 33 wherein:
said valve body of said second valve defines a groove;
said elastic material is in the form of an annular disc and is fitted within said groove; and
said valve seat of said second valve includes a circumferential nose protruding from said valve seat of said second valve for protruding into said elastic material when said second valve is closed.

36. A central valve assembly in accordance with claim 33 wherein said valve body of said first valve is in the form of an annular disc.

37. A central valve assembly in accordance with claim 32:
wherein said piston includes an oblong slot in pressure fluid communication with said pressure fluid reservoir, extending transverse to the axis of said piston and connecting opposite cylindrical sides of said piston, and said piston having a central stepped bore having a step, at which step said valve seat of said first valve and said valve seat of said second valve are located, said step on one side said working chamber and on the other side a supply chamber in permanent fluid communication with said pressure fluid reservoir; and
wherein said master brake cylinder further comprises a casing and a transverse pin plugged through said slot and rigidly anchored to said casing; and
said central valve assembly further comprising:
(a) means, supported within the working chamber side of said central stepped bore:
(i) for biasing said valve body of said first valve towards said valve seat of said first valve, and
(ii) for biasing said valve body of said second valve towards said valve seat of said second valve,
(b) an actuating pin coupled to said valve body of said second valve and extending axially towards said transverse pin for opening said second valve upon abutment with said transverse pin; and
(c) an actuating sleeve, axially displaceably mounted on said actuating pin, separated from said valve body of said first valve when said first valve is closed and extending axially towards said transverse pin for opening said first valve upon abutment with said transverse pin and upon abutment with said valve body of said first valve;
whereby said second valve opens before said first valve opens.

38. A central valve assembly in accordance with claim 32:
said piston has a central stepped bore having a step, at which step said valve seat of said first valve and said valve seat of said second valve are located, said step having on one side said working chamber and on the other side a supply chamber in permanent fluid communication with said pressure fluid reservoir; and wherein said valve body of said first valve has a cylindrical bore; and said central valve assembly further comprising:
(a) an actuating pin sealingly extending through said cylindrical bore of said valve body of said first valve and having a stop located in the supply chamber side of said step and located at a first actuating distance from said valve body of said first valve when said first valve is closed, and
(b) means, located in the working chamber side of said step and coupled to said valve body of said second valve, for opening said second valve after said piston has traveled a second actuating distance, which is less than said first actuating distance, whereby said second valve opens before said first valve opens.

39. A master brake cylinder for an anti-locking hydraulic brake system having a brake pedal push rod, brake circuits, a pressure fluid reservoir containing pressure fluid and a control pump for supplying pressure fluid during a control operation, said master brake cylinder comprising:

a casing having:
(a) a closed end, and
(b) a working chamber, defined by said closed end and said casing, in pressure fluid communication with said brake circuits and said control pump;

a piston confining said working chamber, fitted within said casing, and coupled to said brake pedal push rod for movement along said casing towards said closed end in response to movement of said brake pedal push rod and away from said closed end in response to pressure fluid supplied by said control pump during said control operation;

a central valve assembly, associated with said piston, comprising:
(a) first pressure fluid flow control means including a first valve, having an opening distance, a metal valve body and a metal valve seat, and located within said piston in a fluid flow path extending between said pressure fluid reservoir and said working chamber and:
  (i) responsive to movement of said piston towards said closed end for preventing pressure fluid flow between said working chamber and said pressure fluid reservoir, and
  (ii) responsive to movement of said piston away from said closed end for permitting pressure fluid flow between said working chamber and said pressure fluid reservoir during said control operation; and
(b) second pressure fluid flow control means including a second valve, having an opening distance greater than said opening distance of said first valve, a valve body and a valve seat, at least one of which is an elastic material, and located within said piston in series with said first pressure fluid flow control means in said fluid flow path extending between said pressure fluid reservoir and said working chamber and:
  (i) responsive to movement of said piston towards said closed end for preventing pressure fluid flow between said working chamber and said pressure fluid reservoir, and
  (ii) responsive to movement of said piston away from said closed end for permitting pressure fluid flow between said working chamber and said pressure fluid reservoir during said control operation.

40. A master brake cylinder in accordance with claim 39 wherein said second fluid flow control means respond to movement of said piston:
(a) towards said closed end for preventing pressure fluid flow between said working chamber and said pressure fluid reservoir after said first fluid flow control means respond to movement of said piston towards said closed end for preventing pressure fluid flow between said working chamber and said pressure fluid reservoir, and
(b) away from said closed end for permitting pressure fluid flow between said working chamber and said pressure fluid reservoir during a control operation before said first fluid flow control means respond to movement of said piston away from said closed end for permitting pressure fluid flow between said working chamber and said pressure fluid reservoir during a control operation.

41. A master brake cylinder in accordance with claim 39 wherein said valve seat of said second valve is metal and said valve body of said second valve is said elastic.

42. A central valve assembly in accordance with claim 39 wherein said first valve is a disc-type valve.

43. A central valve assembly in accordance with claim 39 wherein said first valve is a popper valve.

44. A master brake cylinder in accordance with claim 39 wherein:

said piston defines an elongated axial bore extending from said working chamber to a slot in pressure fluid communication with said pressure fluid reservoir, said axial bore including a largest bore extending from said working chamber to a first step, an intermediate bore extending from said first step to a second step, and a narrowest bore extending from said second step to said slot;

said central valve assembly further comprises an insert, rigidly connected to said piston within said axial bore at said first step, on which insert is formed said valve seat of said first valve; and said valve seat of said second valve is located at said second step.

45. A central valve assembly in accordance with claim 44 further comprising:

a carrier body located between said first step and said second step having said valve body of said second valve at the end closest to said second step and having a bore at its other end facing said first step;

an actuating pin rigidly clamped within said bore of said carrier body extending axially through said first step towards said working chamber and in abutment with said valve body of said first valve when said first valve is open; and an actuating plunger rigidly clamped to said carrier body at the end closest to said second step and in abutment with a transverse pin when said second valve is open.

46. A central valve assembly in accordance with claim 45 wherein:

said valve body of said first valve is a valve ball;

said carrier body includes a groove at the end closest to said second step; and said valve seat of said second valve is a rubber ring disposed within said groove.

47. A master brake cylinder in accordance with claim 44 further comprising:
- a carrier body located between said first step and said second step having said valve body of said second valve at the end closest to said second step and having a bore at its other end facing said first step; and
- a cylindrical extension rigidly clamped within said bore of said carrier body extending axially through said first step towards said working chamber; and
- wherein said valve body of said first valve is axially displaceably mounted on said cylindrical extension and is located within said largest bore.

48. A master brake cylinder in accordance with claim 39 wherein:
- said valve seat of said first valve and said valve seat of said second valve are disposed at the same axial position along said master brake cylinder and
- said valve seat of said second valve extends radially outward relative to said valve seat of said first valve.

49. A master brake cylinder in accordance with claim 48:
- wherein said piston includes an oblong slot in pressure fluid communication with said pressure fluid reservoir, extending transverse to the axis of said piston and connecting opposite cylindrical sides of said piston, and said piston having a central stepped bore having a step, at which step said valve seat of said first valve and said valve seat of said second valve are located, said step having on one side said working chamber and on the other side a supply chamber in permanent fluid communication with said pressure fluid reservoir; and
- wherein said master brake cylinder further comprises a casing and a transverse pin plugged through said slot and rigidly anchored to said casing; and
- said central valve assembly further comprising:
  - (a) means, supported within the working chamber side of said central stepped bore:
    - (i) for biasing said valve body of said first valve towards said valve seat of said first valve, and
    - (ii) for biasing said valve body of said second valve towards said valve seat of said second valve,
  - (b) an actuating pin coupled to said valve body of said second valve and extending axially towards said transverse pin to a first actuating distance away from said transverse pin when said second valve is closed, for opening said second valve upon abutment with said transverse pin, and
  - (c) an actuating sleeve, axially displaceably mounted on said actuating pin and coupled to said valve body of said first valve and extending axially towards said transverse pin to a second actuating distance away from said transverse pin when said first valve is closed, for opening said first valve upon abutment with said transverse pin;
- wherein said first actuating distance is less than said second actuating distance, whereby said second valve opens before said first valve.

50. A master brake cylinder in accordance with claim 49 further comprising a rubber spring disposed between said valve/body of said first valve and said valve body of said second valve and surrounding said actuating pin for:
  - (a) sealing an annular gap between said actuating pin and said valve body of said first valve, and
  - (b) for biasing said valve body of said first valve towards said valve seat of said first valve.

51. A master brake cylinder in accordance with claim 49 wherein:
- said valve body of said second valve defines a groove;
- said elastic material is in the form of an annular disc and is fitted within said groove; and
- said valve seat of said second valve includes a circumferential nose protruding from said valve seat of said second valve for protruding into said elastic material when said second valve is closed.

52. A master brake cylinder in accordance with claim 49 wherein said valve body of said first valve is in the form of an annular disc.

53. A master brake cylinder in accordance with claim 48:
- wherein said piston includes an oblong slot in pressure fluid communication with said pressure fluid reservoir, extending transverse to the axis of said piston and connecting opposite cylindrical sides of said piston, and said piston having a central stepped bore having a step, at which step said valve seat of said first valve and said valve seat of said second valve are located, said step on one side said working chamber and on the other side a supply chamber in permanent fluid communication with said pressure fluid reservoir; and
- wherein said master brake cylinder further comprises a casing and a transverse pin plugged through said slot and rigidly anchored to said casing; and
- said central valve assembly further comprising:
  - (a) means, supported within the working chamber side of said central stepped bore:
    - (i) for biasing said valve body of said first valve towards said valve seat of said first valve, and
    - (ii) for biasing said valve body of said second valve towards said valve seat of said second valve,
  - (b) an actuating pin coupled to said valve body of said second valve and extending axially towards said transverse pin for opening said second valve upon abutment with said transverse pin; and
  - (c) an actuating sleeve, axially displaceably mounted on said actuating pin, separated from said valve body of said first valve when said first valve is closed and extending axially towards said transverse pin for opening said first valve upon abutment with said transverse pin and upon abutment with said valve body of said first valve;
- whereby said second valve opens before said first valve opens.

54. A master brake cylinder in accordance with claim 48
- wherein said piston has a central stepped bore having a step, at which step said valve seat of said first valve and said valve seat of said second valve are located, said step having on one side said working chamber and on the other side a supply chamber in permanent fluid communication with said pressure fluid reservoir; and
- wherein said valve body of said first valve has a cylindrical bore; and
- said central valve assembly further comprising:
  - (a) an actuating pin sealingly extending through said cylindrical bore of said valve body of said first valve and having a stop located in the supply chamber side of said step and located at a first actuating distance from said valve body of said first valve when said first valve is closed, and (b) means, located in the working chamber side of said step and coupled to said valve body of said second valve, for opening said second valve after said piston has traveled a second actuating distance, which is less than said first actuating distance, whereby said second valve opens before said first valve opens.

55. A master brake cylinder for an anti-locking hydraulic brake system having a brake pedal push rod, brake circuits, a pressure fluid reservoir containing pressure fluid and a control pump for supplying pressure fluid during a control operation, said master brake cylinder comprising:

a casing having:
 (a) a closed end,
 (b) a first working chamber, defined by said closed end and said casing, in pressure fluid communication with said brake circuits and said control pump, and
 (c) a second working chamber, defined by said casing, in pressure fluid communication with said brake circuits and said control pump;

a push rod piston confining said second working chamber, fitted within said casing, and connected to said brake pedal push rod for movement along said casing towards said closed end in response to movement of said brake pedal push rod and away from said closed end in response to pressure fluid supplied by said control pump during said control operation;

a first central valve, associated with said push rod piston, comprising:
 (a) first pressure fluid flow control means located within said push rod piston in a fluid flow path extending between said pressure fluid reservoir and said working chamber and:
  (i) responsive to movement of said push rod piston-towards said closed end for preventing pressure fluid flow between said working chamber and said pressure fluid reservoir, and
  (ii) responsive to movement of said push rod piston away from said closed end for permitting, pressure fluid flow between said working chamber and said pressure fluid reservoir during said control operation; and
 (b) second pressure fluid flow control means located within said piston in series with said first pressure fluid flow control means in said fluid flow path extending between said pressure fluid reservoir and said working chamber and:
  (i) responsive to movement of said push rod piston towards said closed end for preventing pressure fluid flow between said working chamber and said pressure fluid reservoir, and
  (ii) responsive to movement of said push rod piston away from said closed end for permitting pressure fluid flow between said working chamber and said pressure fluid reservoir during said control operation;

a floating piston confining said first working chamber on one end and said second working chamber on its other end, fitted within said casing, and coupled to said push rod piston for movement along said casing towards said closed end in response to movement of said push rod piston and away from said closed end in response to pressure fluid supplied by said control pump during said control operation;

a second central valve, associated with said floating piston, comprising:
 (a) third pressure fluid flow control means located within said floating piston in a fluid flow path extending between said pressure fluid reservoir and said working chamber and:
  (i) responsive to movement of said floating piston towards said closed end for preventing pressure fluid flow between said working chamber and said pressure fluid reservoir, and
  (ii) responsive to movement of said floating piston away from said closed end for permitting pressure fluid flow between said working chamber and said pressure fluid reservoir during said control operation; and
 (b) fourth pressure fluid flow control means located within said floating piston in series with said third pressure fluid flow control means in said fluid flow path extending between said pressure fluid reservoir and said working chamber and:
  (i) responsive to movement of said floating piston towards said closed end for preventing pressure fluid flow between said working chamber and said pressure fluid reservoir, and
  (ii) responsive to movement of said floating piston away from said closed end for permitting pressure fluid flow between said working chamber and said pressure fluid reservoir during said control operation.

* * * * *